United States Patent
Nishida et al.

(10) Patent No.: US 9,544,874 B2
(45) Date of Patent: Jan. 10, 2017

(54) PAGING METHOD, CORE NETWORK APPARATUS, RADIO ACCESS NETWORK APPARATUS AND GATEWAY APPARATUS

(75) Inventors: Katsutoshi Nishida, Tokyo (JP); Keisuke Suzuki, Tokyo (JP); Shimpei Kawakatsu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 109 days.

(21) Appl. No.: 13/812,143

(22) PCT Filed: Dec. 28, 2010

(86) PCT No.: PCT/JP2010/073775
§ 371 (c)(1),
(2), (4) Date: Mar. 11, 2013

(87) PCT Pub. No.: WO2012/014342
PCT Pub. Date: Feb. 2, 2012

(65) Prior Publication Data
US 2013/0170438 A1    Jul. 4, 2013

(30) Foreign Application Priority Data

Jul. 30, 2010   (JP) ................... 2010-172794

(51) Int. Cl.
*H04W 68/00*  (2009.01)
*H04W 28/02*  (2009.01)
(Continued)

(52) U.S. Cl.
CPC ....... *H04W 68/005* (2013.01); *H04W 28/0252* (2013.01); *H04W 28/0263* (2013.01); *H04W 68/02* (2013.01); *H04W 8/30* (2013.01)

(58) Field of Classification Search
CPC ...... H04W 68/005; H04W 68/02; H04W 8/30; H04W 76/00; H04W 60/00; H04W 68/00; H04W 76/06; H04W 8/16; H04W 92/24; H04W 76/046; H04W 76/064; H04W 76/02; H04W 76/028; H04W 76/007; H04W 80/10; H04W 72/1278; H04W 48/16; H04W 28/0263; H04W 28/0252; H04W 28/0257; H04L 61/3075; H04L 65/1016
(Continued)

(56) References Cited

U.S. PATENT DOCUMENTS

| 6,731,944 B1 * | 5/2004 | Ostrup et al. ................. 455/458 |
| 8,515,465 B2 * | 8/2013 | Olsson ................. H04W 68/00 370/312 |

(Continued)

FOREIGN PATENT DOCUMENTS

| CN | 101466083 A | 6/2009 |
| JP | 2009-153141 A | 7/2009 |
| WO | 2008/014122 A2 | 1/2008 |

OTHER PUBLICATIONS

3GPP 23.401 V9.5.0 (Techincal Specificaiton) 3rd Generation Partnership Project; Technical Specification Group Services and System Aspects; General Packet Radio Service (GPRS) enhancements for Evolved Universal Terrestrial Radio Access Network (E-UTRAN) access (Release 9), (Jun. 2010), 259 Pages.*
(Continued)

*Primary Examiner* — Edan Orgad
*Assistant Examiner* — Ivan O Latorre
(74) *Attorney, Agent, or Firm* — Osha Liang LLP (57) ABSTRACT

A paging method of the present invention is a paging method for paging a UE (10) in an idle state when a P-GW (20) receives a packet for the UE (10) and includes the steps of: in a S-GW (30), setting reception type information of the packet received by the P-GW (20) in "Downlink Data Notification" and sending the "Downlink Data Notification" to an MME (40) and an SGSN (60), and in the MME (40)

(Continued)

and SGSN (60), determining whether or not to page the UE (10) based on the reception type information included in the "Downlink Data Notification" from the S-GW (30).

5 Claims, 9 Drawing Sheets (51) Int. Cl.
*H04W 68/02* (2009.01)
*H04W 8/30* (2009.01)

(58) Field of Classification Search
USPC ............... 370/311, 312, 328, 329, 389, 411; 455/422.1, 426.1, 456.1, 458, 515
See application file for complete search history.

(56) References Cited

U.S. PATENT DOCUMENTS

| | | | |
|---|---|---|---|
| 2007/0060175 A1* | 3/2007 | Park et al. | 455/458 |
| 2007/0117575 A1* | 5/2007 | Courau et al. | 455/458 |
| 2008/0025250 A1 | 1/2008 | Wang et al. | |
| 2008/0225760 A1* | 9/2008 | Iyer et al. | 370/310 |
| 2009/0016344 A1* | 1/2009 | Hu | H04L 47/41 370/389 |
| 2009/0285157 A1* | 11/2009 | Yeoum et al. | 370/328 |
| 2009/0286528 A1* | 11/2009 | Lie et al. | 455/422.1 |
| 2010/0124223 A1* | 5/2010 | Gibbs et al. | 370/389 |
| 2010/0178941 A1* | 7/2010 | Chun et al. | 455/458 |
| 2010/0220680 A1* | 9/2010 | Ramankutty et al. | 370/329 |
| 2010/0255808 A1 | 10/2010 | Guo et al. | |
| 2011/0103277 A1* | 5/2011 | Watfa et al. | 370/310 |
| 2011/0105155 A1* | 5/2011 | Bienas et al. | 455/458 |
| 2011/0286465 A1* | 11/2011 | Koodli et al. | 370/401 |
| 2011/0310804 A1* | 12/2011 | Beygzadeh | H04W 68/00 370/328 |
| 2012/0069797 A1* | 3/2012 | Lim | H04W 28/18 370/328 |
| 2012/0157132 A1* | 6/2012 | Olsson et al. | 455/458 |

OTHER PUBLICATIONS

International Search Report issued in PCT/JP2010/073775 mailed Mar. 1, 2011 (2 pages).
3GPP TS 23.401 V9.5.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)"; Jun. 2010; pp. 29-32, 44-45, 114-121 (15 pages).
Espacenet Abstract Publication No. JP2009153141A dated Jul. 9, 2009 (1 page).
Office Action issued Feb. 19, 2015, in corresponding European Application No. 10855348.8 (4 pages).
Extended Search Report issued Mar. 28, 2014, in corresponding European Application No. 10855348.8 (6 pages).
Office Action issued Aug. 29, 2013, in corresponding Chinese Application No. 201080068449.1 (8 pages).

* cited by examiner

PAGING METHOD, CORE NETWORK APPARATUS, RADIO ACCESS NETWORK APPARATUS AND GATEWAY APPARATUS

TECHNICAL FIELD

The present invention relates to a paging method, a core network apparatus, a radio access network apparatus and a gateway apparatus for paging a user terminal in an idle state when receiving a packet for the user terminal.

BACKGROUND ART

In conventional mobile communication systems, when a packet for a user terminal in an idle state is received, a core network apparatus (e.g., MME (Mobility Management Entity) and SGSN (Serving GPRS Support Node)) provided on a core network sends a paging signal for paging the user terminal to a radio access network apparatus (e.g., RNC (Radio Network Controller)/BSC (Base Station Controller) or eNodeB) provided on a radio access network. The radio access network apparatus sends a paging signal for paging the user terminal in response to the paging signal received from the core network apparatus. The user terminal performs reception processing with the core network apparatus in response to the paging signal sent from the radio access network apparatus (e.g., Non-Patent Literature 1).

In such a mobile communication system, when a packet is received for the user terminal in the idle state, it is known that the core network apparatus or radio access network apparatus applies a paging restriction for restricting the paging to the user terminal. Such a paging restriction is applied, for example, when the core network apparatus or radio access network apparatus is in a congestion state.

CITATION LIST

Non-Patent Literature

Non-Patent Literature 1: 3GPP TS23.401

SUMMARY OF INVENTION

Technical Problem

However, when the core network apparatus or radio access network apparatus performs the aforementioned paging restriction, the above-described mobile communication system stops paging of the user terminal irrespective of the type of the packet received for the user terminal. For this reason, even when the mobile communication system receives a packet with high priority that should be received (e.g., packet belonging to communication that should be passed through even in a congestion state), there is a problem that it is not possible to page the user terminal which is in an idle state.

The present invention has been implemented in view of such circumstances and it is an object of the present invention to provide a paging method, a core network apparatus, a radio access network apparatus and a gateway apparatus capable of flexibly paging a user terminal in an idle state when a packet is received for the user terminal.

Solution to Problem

A paging method according to a first aspect of the present invention is a paging method for paging a user terminal in an idle state when a first gateway apparatus receives a packet for the user terminal, the paging method including the steps of: in a second gateway apparatus, setting reception type information of the packet received by the first gateway apparatus in a paging request signal, and sending the paging request signal to a core network apparatus; and in the core network apparatus, determining whether or not to page the user terminal based on the reception type information included in the paging request signal from the second gateway apparatus.

According to this configuration, since the second gateway apparatus sets, in the paging request signal, the reception type information on the packet for the user terminal in the idle state received by the first gateway apparatus, the core network apparatus can determine whether or not to page the user terminal based on the reception type information included in the paging request signal. Therefore, the core network apparatus can page the user terminal depending on contents of the reception type information even in a situation in which a paging restriction is normally applied to the user terminal in such a case where the user terminal is in a congestion state.

A paging method according to a second aspect of the present invention is a paging method for paging a user terminal in an idle state, when a first gateway apparatus receives a packet for the user terminal, the paging method including the steps of: in a second gateway apparatus, setting reception type information of the packet received by the first gateway apparatus in a paging request signal and sending the paging request signal to a core network apparatus; in the core network apparatus, setting paging information for paging the user terminal in a paging signal based on the reception type information included in the paging request signal from the second gateway apparatus and sending the paging signal to a radio access network apparatus; and in the radio access network apparatus, determining whether or not to page the user terminal based on the paging information included in the paging signal from the core network apparatus.

According to this configuration, the core network apparatus sets paging information in a paging signal based on the reception type information included in the paging request signal from the second gateway apparatus, and the radio access network apparatus can thereby page the user terminal based on the paging information included in the paging signal. Therefore, the radio access network apparatus can page the user terminal depending on the contents of the paging information even in a situation in which a paging restriction is normally applied to the user terminal when, for example, the radio access network apparatus is in a congestion state.

A core network apparatus according to a third aspect of the present invention is a core network apparatus configured to page, when a first gateway apparatus receives a packet for a user terminal in an idle state, the user terminal, wherein the core network apparatus is configured to receive a paging request signal including reception type information which indicates a reception type of the packet from a second gateway apparatus connected to the first gateway apparatus, and determine whether or not to page the user terminal based on the reception type information included in the received paging request signal.

A radio access network apparatus according to a fourth aspect of the present invention is a radio access network apparatus configured to page, when a first gateway apparatus receives a packet for a user terminal in an idle state, the user terminal, wherein when a core network apparatus receives a paging request signal including reception type information which indicates a reception type of the packet from a second gateway apparatus connected to the first gateway apparatus, the radio access network apparatus is configured to receive a paging signal including paging information set based on the reception type information from the core network apparatus and determine whether or not to page the user terminal based on the paging information included in the paging signal from the core network apparatus.

A gateway apparatus according to a fifth aspect of the present invention is a gateway apparatus configured to send, when receiving a packet for a user terminal in an idle state, a paging request signal to a core network apparatus, wherein the gateway apparatus is configured to set reception type information of the packet in the paging request signal and send the paging request signal to the core network apparatus.

Advantageous Effects of Invention

According to the present invention, when a packet for a user terminal in an idle state is received, it is possible to provide a paging method, a core network apparatus, a radio access network apparatus and a gateway apparatus capable of flexibly paging the user terminal.

DESCRIPTION OF EMBODIMENTS

Hereinafter, embodiments of the present invention will be described in detail with reference to the accompanying drawings.

First Embodiment

Schematic Configuration of Mobile Communication System

Figure 1:
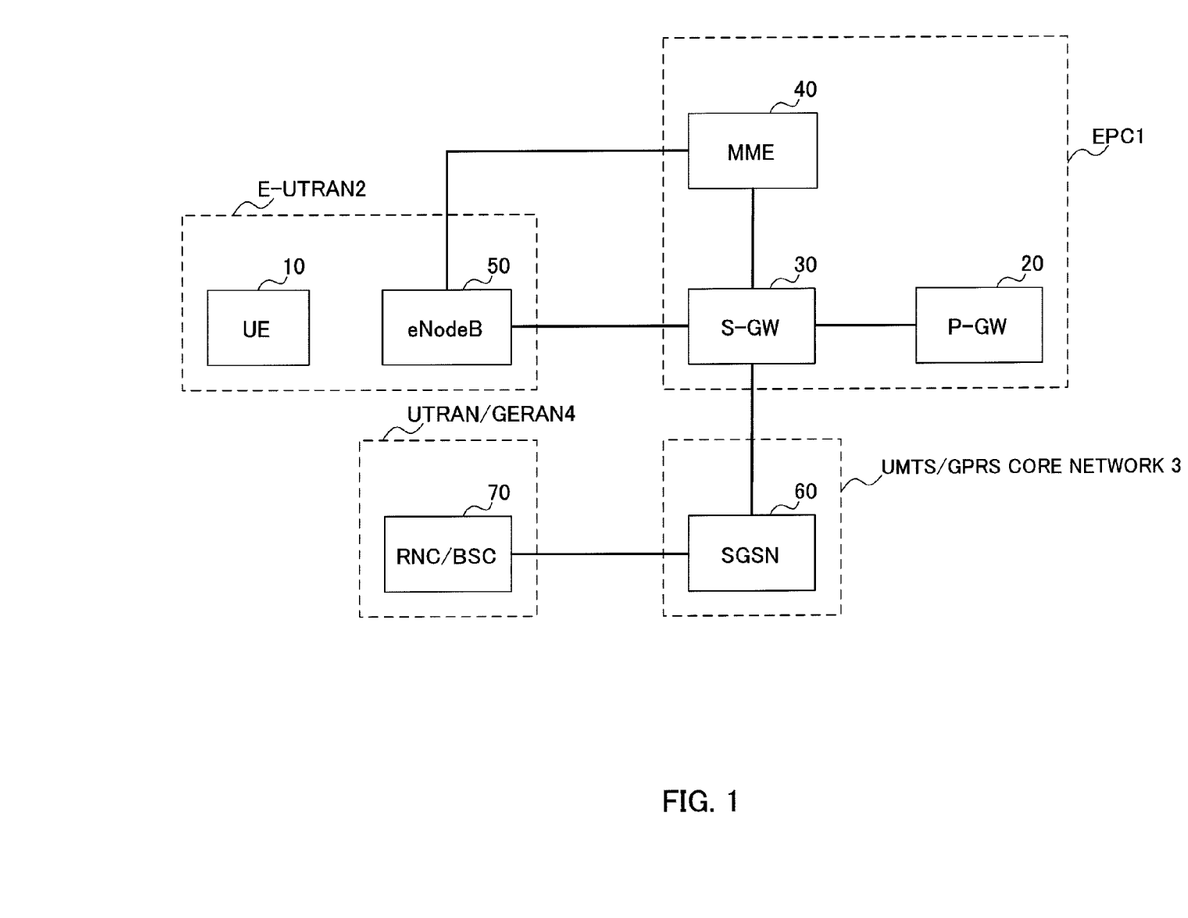
FIG. 1 is a schematic block diagram of a mobile communication system according to a first embodiment.

FIG. 1 is a schematic block diagram of a mobile communication system according to a first embodiment. As shown in FIG. 1, the mobile communication system according to the first embodiment is a system provided with compatibility between a next-generation communication scheme such as LTE and a second/third-generation communication scheme, and is constructed of an EPC (Evolved Packet Core) 1 which is a core network in the next-generation communication scheme, an E-UTRAN 2 which is a radio access network in the next-generation communication scheme, a UMTS (Universal Mobile Telecommunications System)/GPRS (General Packet Radio Service) core network 3 which is a core network in the second/third-generation communication scheme and a UTRAN/GERAN 4 which is a radio access network in the second/third-generation communication scheme.

A UE (User Equipment) 10 is a user terminal supporting one or a plurality of communication schemes such as mobile phone terminal, notebook personal computer. For example, in FIG. 1, the UE 10 supports the next-generation communication scheme such as LTE and the second/third-generation communication scheme, and can be located in the service areas of both radio zones of the E-UTRAN 2 and the UTRAN/GERAN 4. Furthermore, in FIG. 1, the UE 10 may also be configured to support the next-generation communication scheme such as LTE and be able to be located only in the service area of the radio zone of E-UTRAN 2.

The EPC 1 is provided with a P-GW (PDN Gateway) 20 (first gateway apparatus) that becomes a connection point with a PDN (Packet Data Network) such as the Internet, an S-GW (Serving Gateway) 30 (second gateway apparatus) that becomes an anchor point of a packet transmission path of the UE 10 which moves between radio zones of the E-UTRAN 2 and UTRAN/GERAN 4 and an MME 40 (core network apparatus) that pages the UE 10 located in the service area of the radio zone of the E-UTRAN 2. The S-GW 30 is connected to the P-GW 20, the MME 40, and an eNodeB 50 and an SGSN 60 which will be described later.

The E-UTRAN 2 is provided with the eNodeB 50 (radio access network apparatus) that performs radio communication with the UE 10 located in the service area of the radio zone of the E-UTRAN 2. The eNodeB 50 is connected to the S-GW 30 and the MME 40.

The UMTS/GPRS core network 3 is provided with the SGSN 60 (core network apparatus) that pages the UE 10 located in the service area of the radio zone of the UTRAN/GERAN 4.

The UTRAN/GERAN 4 is provided with an NodeB (not shown) that performs radio communication with the UE 10 located in the service area of the radio zone of the E-UTRAN 2 and an RNC/BSC 70 (radio access network apparatus) that controls radio communication between the UE 10 and the NodeB (not shown). The RNC/BSC 70 is connected to the SGSN 60.

In the mobile communication system shown in FIG. 1, a PDN connection which is an IP session is set between the UE 10 and a PDN (not shown) via the P-GW 20. By the PDN connection, the UE 10 identified with an IP address is connected to the PDN (not shown) identified by an APN (Access Point Name).

Furthermore, in the mobile communication system shown in FIG. 1, an EPS bearer which is a logical communication path in the next-generation communication scheme is set between the UE 10 located in the service area of the radio zone of the E-UTRAN 2 and the P-GW 20 or S-GW 30. An incoming packet from the PDN (not shown) is sent to the UE 10 located in the service area of the radio zone of the E-UTRAN 2 via such an EPS bearer. To be more specific, an incoming packet from the PDN (not shown) is distinguished at the P-GW 20 or S-GW 30 according to a TFT (Traffic Flow Template), mapped to the EPS bearer for each flow of the packet and sent via the mapped EPS bearer.

Furthermore, in the mobile communication system shown in FIG. 1, a UMTS/GPRS bearer which is a logical communication path in the second/third-generation communication scheme is set between the UE 10 located in the service area of the radio zone of the UTRAN/GERAN 4 and the SGSN 60. Such a UMTS/GPRS bearer is connected to the EPS bearer set between the SGSN 60 and the S-GW 30 or P-GW 20. An incoming packet from the PDN (not shown) via the UMTS/GPRS bearer and the EPS bearer is sent to the UE 10 located in the service area of the radio zone of the UTRAN/GERAN 4.

Furthermore, in the mobile communication system shown in FIG. 1, a default bearer is set between the UE 10 located in the service area of the radio zone of the E-UTRAN 2 or UTRAN/GERAN 4 and the P-GW 20 when the aforementioned PDN connection is set.

<Detailed Configuration of Mobile Communication System>

Figure 2:
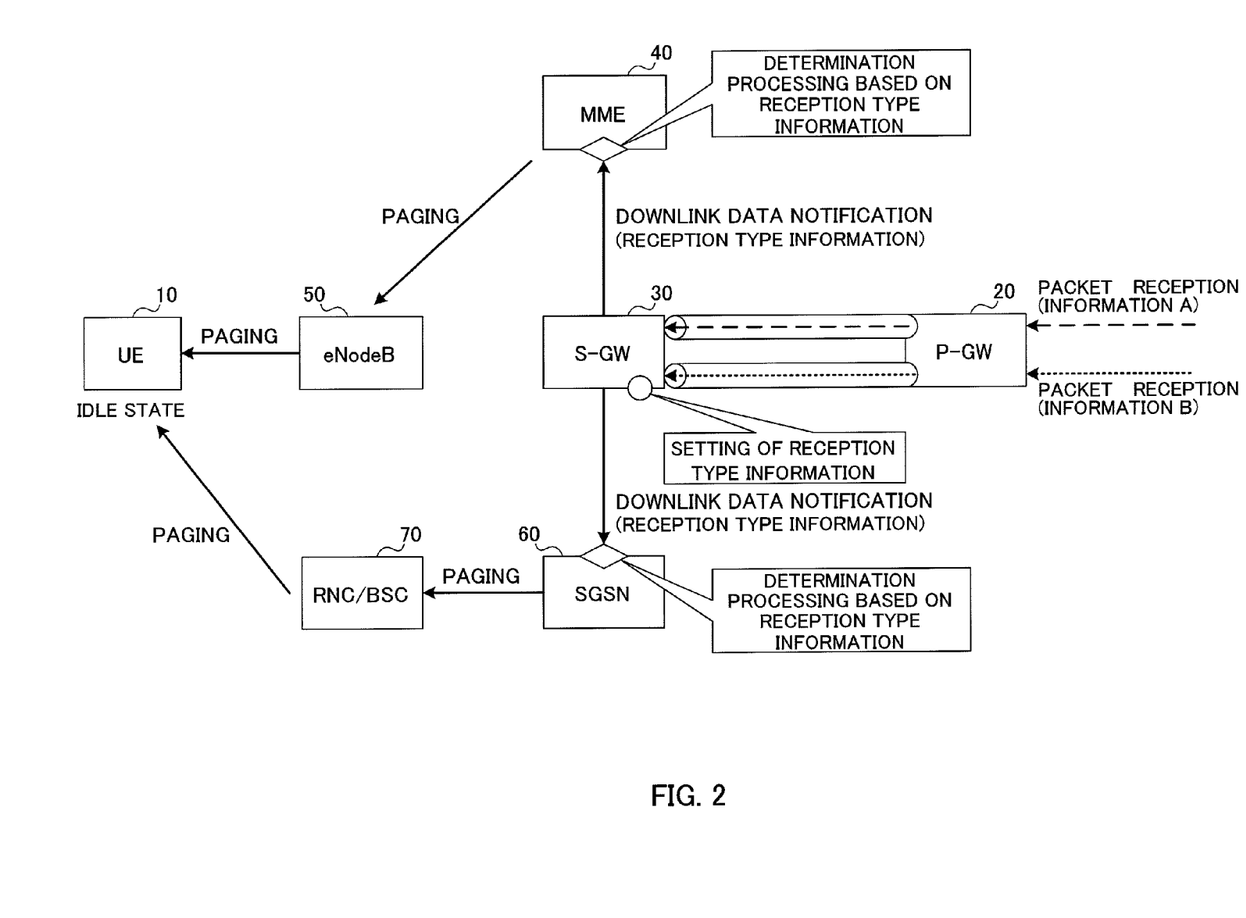
FIG. 2 is a function configuration diagram of paging processing in the mobile communication system according to the first embodiment.

A case will be described in the first embodiment below where the MME 40 and the SGSN 60 which are core network apparatuses determines whether or not to page the UE 10 in the idle state. FIG. 2 is a function configuration diagram of paging processing in the mobile communication system according to the first embodiment. In FIG. 2, suppose ISR (Idle State Reduction) to reduce the frequency with which the UE 10 in the idle state moving between the radio zones of the E-UTRAN 2 and UTRAN/GERAN 4 updates its location registration area is applied.

As shown in FIG. 2, the P-GW 20 receives packets which belong to different communication bearers (here, information A and information B) directed to the UE 10 in the idle state from the PDN (not shown). The P-GW 20 encapsulates packets for each communication bearer and sends the encapsulated packet to the S-GW 30 as a GTP-U packet or GRE (Generic Routing Encapsulation) packet.

The S-GW 30 sets reception type information indicating the reception type of the packet for the UE 10 in the idle state received by the P-GW 20 in "Downlink Data Notification." Here, "Downlink Data Notification" is a paging request signal for requesting a page to the UE 10 in the idle state.

To be more specific, the S-GW 30 sets the reception type information based on at least one of the bearer identification information, bearer QoS information, default bearer information, P-GW information, PDN connection information, flow identification information and S-GW load information.

Here, the bearer identification information is identification information of the bearer via which the packet received by the P-GW 20 is transferred. The bearer identification information includes, for example, "EPS bearer ID" for identifying the aforementioned EPS bearer and "GPRS/UMTS bearer ID" for identifying the aforementioned GPRS/UMTS bearer or the like.

Furthermore, the bearer QoS information is information indicating QoS of the bearer via which the packet received by the P-GW 20 is transferred. The bearer QoS information includes, for example, "ARP: Allocation and Retention Priority" indicating relative priority among EPS bearers when setting/changing the aforementioned EPS bearer, "GBR: Guaranteed Bit Rate" indicating, when the aforementioned EPS bearer or UMTS/GPRS bearer is a GBR bearer whose transfer rate is guaranteed, a guaranteed transfer rate of the GPR bearer, "MBR: Maximum Bit Rate" indicating a maximum bit rate of the GBR bearer and "QCI: QoS Class Identifier" indicating a QoS class of the aforementioned EPS bearer or UMTS/GPRS bearer.

Furthermore, the default bearer information is information on a default bearer set between the UE 10 and the P-GW 20 as described above. The default bearer information includes, for example, "default bearer ID" identifying the default bearer or information indicating QoS of the default bearer.

Furthermore, the P-GW information (first gateway apparatus information) is information on the P-GW 20 that receives a packet for the UE 10 in the idle state from the PDN (not shown). Examples of the P-GW information include P-GW identifier for identifying the P-GW 20, "TEID: Tunnel Endpoint Identifier" which is a termination identifier of a GTP tunnel that terminates at the P-GW 20, "GRE Key" which is a termination identifier of a GPE tunnel and IP address of the P-GW 20.

Furthermore, the PDN connection information is information on the aforementioned PDN connection set between the UE 10 and the PDN (not shown) via the P-GW 20 to send a packet received by the P-GW 20. The PDN connection information includes, for example, "APN: Access Point Name" for identifying both the aforementioned PDN (not shown) and the P-GW 20 which is a point of connection to the PDN (not shown).

Furthermore, the flow identification information is identification information of a service data flow of an IP packet received by the P-GW 20. The flow identification information includes, for example, "TFT: Traffic Flow Template." Furthermore, the S-GW load information (second gateway apparatus load information) is information indicating a load of the S-GW 30.

The reception type information may include at least one of the above-described bearer identification information, bearer QoS information, default bearer information, P-GW information, PDN connection information, flow identification information and S-GW load information. Furthermore, the reception type information may also be a parameter (e.g., 1: reception type 1, 2: reception type 2, 3: reception type 3 or the like) associated with at least one of the above-described bearer identification information, bearer QoS information, default bearer information, P-GW information, PDN connection information, flow identification information and S-GW load information.

The S-GW 30 sends "Downlink Data Notification" including reception type information to a core network apparatus connected to the S-GW 30. To be more specific, the S-GW 30 sends "Downlink Data Notification" including reception type information to the MME 40 which is a core network apparatus provided in the EPC 1 and the SGSN 60 which is a core network apparatus provided in the UMTS/GPRS core network 3.

The MME 40 which is a core network apparatus provided in the EPC 1 determines whether or not to page the UE 10 located in the service area of the radio zone of the E-UTRAN 2 based on the reception type information included in "Downlink Data Notification" from the S-GW 30. In the case of predetermined reception type information, the MME 40 sends "Paging" to the eNodeB 50 which is a radio access network apparatus provided in the E-UTRAN 2. Here, "Paging" is a paging signal to page the UE 10. The eNodeB 50 sends "Paging" to the UE 10 in response to "Paging" from the MME 40.

Similarly, the SGSN 60 which is a core network apparatus provided on the UMTS/GPRS core network 3 determines whether or not to page the UE 10 located in the service area of the radio zone of the UTRAN/GERAN 4 based on reception type information included in "Downlink Data Notification" from the S-GW 30. In the case of predetermined reception type information, the SGSN 60 sends "Paging" to the RNC/BSC 70 which is a radio access network apparatus provided in the UTRAN/GERAN 4. The RNC/BSC 70 sends "Paging" to the UE 10 in response to "Paging" from the SGSN 60.

As described above, in the mobile communication system according to the first embodiment, the S-GW 30 sets reception type information of a packet for the UE 10 in the idle state received by the P-GW 20 in "Downlink Data Notification," and therefore the MME 40 and the SGSN 60 which are core network apparatuses can determine whether or not to page the UE 10 based on the reception type information included in "Downlink Data Notification" respectively. Therefore, the MME 40 and the SGSN 60 can page the UE 10 even when a paging restriction is normally applied to the UE 10 when, for example, the MME 40 or the SGSN 60 is in a congestion state, depending on contents of the reception type information.

Furthermore, the mobile communication system according to the first embodiment sets reception type information based on at least one of bearer identification information, bearer QoS information, default bearer information, P-GW information, PDN connection information, flow identification information and S-GW load information, and can thereby determine whether or not to page the UE 10 based on detailed conditions per bearer, per QoS of each bearer, per PDN connection, per flow or a combination thereof or the like together with the MME 40 and the SGSN 60 which are core network apparatuses, and thereby perform flexible paging control.

An example has been described in the paging processing shown in FIG. 2 where the S-GW 30 sends "Downlink Data Notification" including reception type information to both the MME 40 and the SGSN 60, and the MME 40 and the SGSN 60 determine whether or not to page the UE 10 based on the reception type information respectively. However, the present invention is not limited to such an example, and may send "Downlink Data Notification" including reception type information to any one of the MME 40 and the SGSN 60 and determine whether or not to page the UE 10 based on the reception type information.

Furthermore, the core network apparatus that determines whether or not to page the UE 10 in the present invention is not limited to the MME 40 provided on the EPC 1 or the SGSN 60 provided on the UMTS/GPRS core network 3, but may also be an apparatus for paging the UE 10 provided on a core network in a different communication scheme. Similarly, the radio access network apparatus of the present invention is not limited to the eNodeB 50 provided on the E-UTRAN 2 or the RNC/BSC 70 provided on the UTRAN/GERAN 4, but may also be an apparatus for paging the UE 10 provided on a radio access network in a different communication scheme.

Furthermore, each apparatus shown in FIG. 2 (that is, P-GW 20, S-GW 30, MME 40, eNodeB 50, SGSN 60, RNC/BSC 70) includes hardware including communication interface, processor, memory, transmission/reception circuit or the like, and a software module executed by a processor is stored in the memory. The function configuration of each apparatus described above may be implemented by the hardware described above or implemented by a software module executed by the processor or implemented by a combination of the two.

<Operation of Mobile Communication System>

Next, a paging operation in the mobile communication system according to the first embodiment configured above will be described with reference to FIG. 3 and FIG. 4. Suppose the above-described ISR is applied to the following operation.

Figure 3:
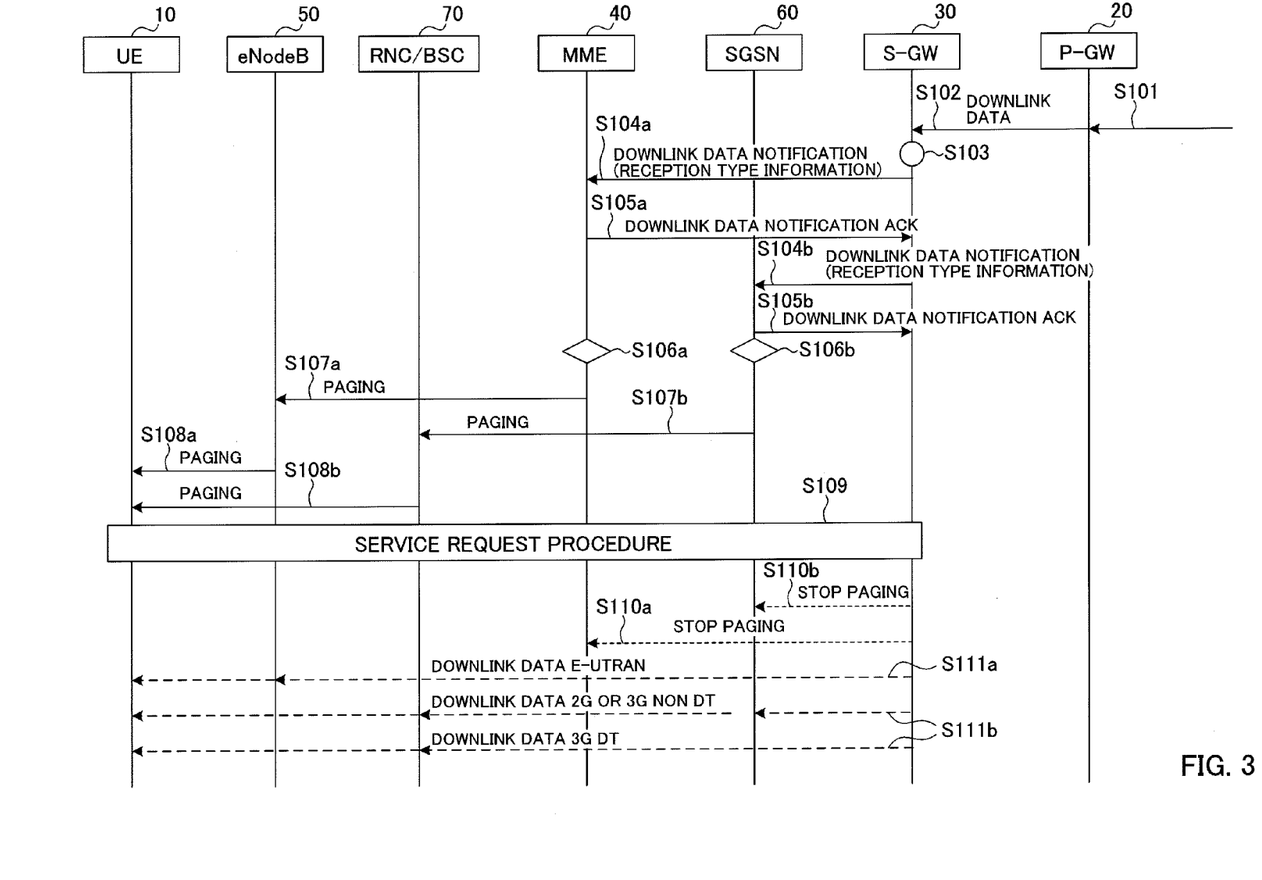
FIG. 3 is a sequence diagram illustrating a paging operation in the mobile communication system according to the first embodiment.

As shown in FIG. 3, the P-GW 20 receives a packet from the PDN (not shown) (step S101). The P-GW 20 encapsulates the received packet and sends the encapsulated packet to the S-GW 30 as a GTP-U packet or GRE packet (step S102).

In response to the reception of the GTP-U packet or GRE packet from the P-GW 20, the S-GW 30 sets reception type information indicating the type of the packet reception at the P-GW 20 in "Downlink Data Notification" (step S103). To be more specific, as described above, the S-GW 30 sets the reception type information based on at least any one of bearer identification information, bearer QoS information, default bearer information, P-GW information, PDN connection information, flow identification information and S-GW load information.

The S-GW 30 sends "Downlink Data Notification" including the reception type information to the MME 40 (step S104*a*). When "Downlink Data Notification" including the reception type information is received from the S-GW 30, the MME 40 sends "Downlink Data Notification Ack" indicating the reception of "Downlink Data Notification" to the S-GW 30 (step S105*a*). The MME 40 determines, based on the reception type information included in "Downlink Data Notification" from the S-GW 30, whether or not to page the UE 10 located in the service area of the radio zone of the E-UTRAN 2 (step S106*a*). The paging processing in step S106*a* will be described in detail with reference to FIG. 4. FIG. 4 is a flowchart indicating the paging processing in the MME 40.

Figure 4:
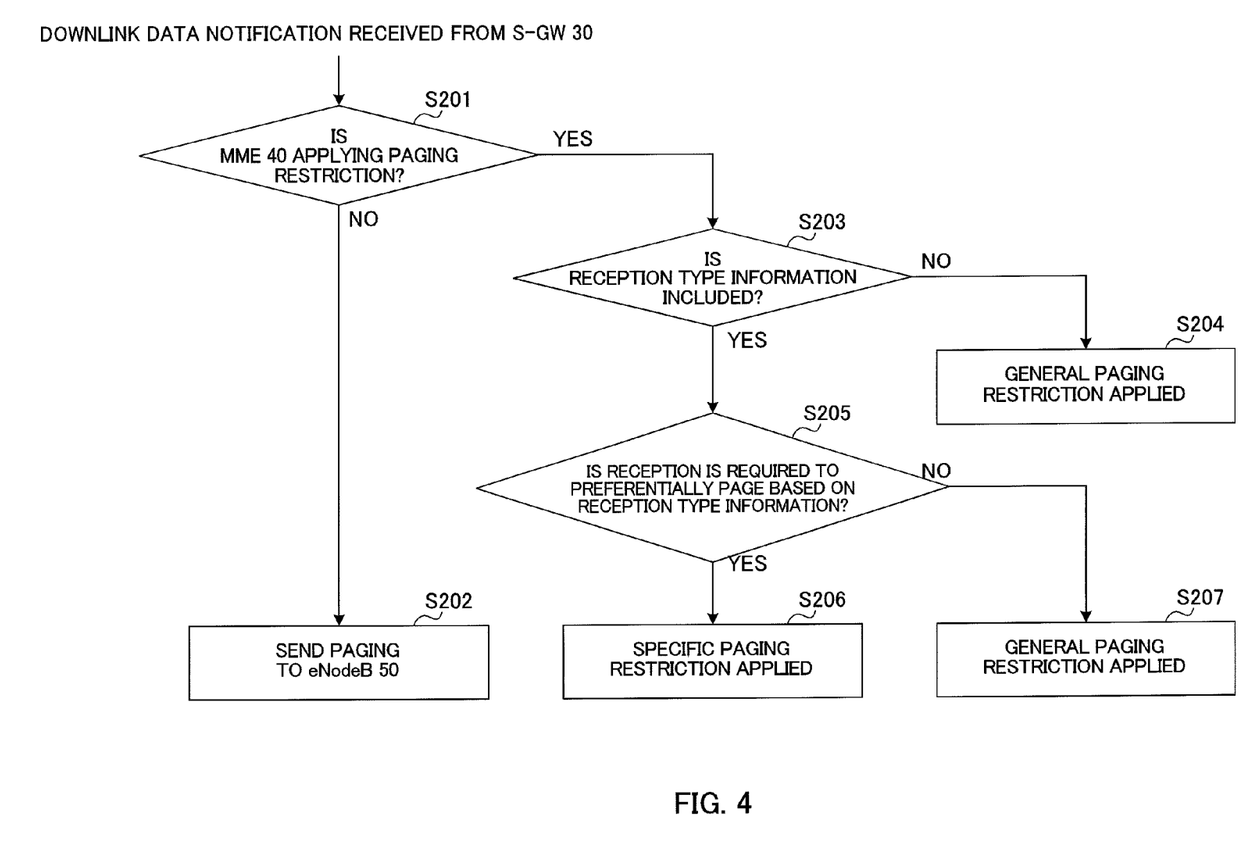
FIG. 4 is a flowchart illustrating paging processing in MME or SGSN according to the first embodiment.

As shown in FIG. 4, when "Downlink Data Notification" is received from the S-GW 30, the MME 40 determines whether or not a paging restriction is applied to the MME 40 (step S201). A paging restriction is applied when, for example, the MME 40 is in a congestion state or when the operator instructs that a paging restriction be applied to a specific subscriber unit or all subscribers. However, the present step is omissible and the present flowchart may also be started from step S203.

When a paging restriction is not applied to the MME 40 (step S201; No), the MME 40 sends "Paging" for paging the UE 10 in the idle state to the eNodeB 50 (step S202).

When a paging restriction is applied to the MME 40 (step S201; Yes), the MME 40 determines whether "Downlink Data Notification" from the S-GW 30 includes reception type information or not (step S203).

When "Downlink Data Notification" from the S-GW 30 does not include reception type information (step S203; No), the MME 40 determines whether or not to send "Paging" for paging the UE 10 in the idle state according to a general paging restriction (step S204). According to such a general paging restriction, when the MME 40 is in a congestion state or when a predetermined condition set by the operator is satisfied (e.g., a specific subscriber unit or all subscribers is/are specified), sending of "Paging" is canceled irrespective of the above-described reception type information. When sending of "Paging" is canceled according to the paging restriction, the MME 40 performs paging failure processing together with the S-GW 30 or P-GW 20. On the other hand, when sending of "Paging" is not canceled according to the general paging restriction, the MME 40 sends "Paging" to the eNodeB 50.

When "Downlink Data Notification" from the S-GW 30 includes reception type information (step S203; Yes), the MME 40 determines based on the reception type information whether the reception is required to page the UE 10 preferentially or not (step S205).

When the MME 40 determines that the reception is required to page the UE 10 preferentially (step S205; Yes), the MME 40 determines whether or not to send "Paging" for paging the UE 10 in the idle state according to a specific paging restriction (step S206). According to the specific paging restriction, when the above-described reception type information satisfies a predetermined condition, sending of "Paging" is canceled. When sending of "Paging" is canceled according to the specific paging restriction, the MME 40 performs paging failure processing together with the S-GW 30 or P-GW 20. On the other hand, when sending of "Paging" is not canceled according to the specific paging restriction, the MME 40 sends "Paging" to the eNodeB 50.

When the MME 40 determines that the reception is not required to page the UE 10 preferentially (step S205; No), the MME 40 cancels sending of "Paging" for paging the UE 10 in the idle state (step S207). Since the processing contents in the present step are similar to those in step S204, descriptions thereof will be omitted.

As described above, paging determination processing in the MME 40 is performed in step S106a in FIG. 3. When sending of "Paging" is not canceled in step S206 in FIG. 4, the MME 40 sends "Paging" to the eNodeB 50 (step S107a). The eNodeB 50 sends "Paging" to the UE 10 located in the service area of the radio zone of the E-UTRAN 2 in response to "Paging" from the eNodeB 50 (step S108a).

Processing similar to that in steps S104a to S108a above is also performed in steps S104b to S108b. The MME 40 and eNodeB in steps S104a to S108a correspond to the SGSN 60 and RNC/BSC 70 in steps S104b to S108b. In step S106b, suppose the paging determination processing shown in steps S201 to S207 in FIG. 4 is performed in the SGSN 60.

When located in the radio zone of the E-UTRAN 2, the UE 10 performs packet reception processing between the eNodeB 50, MME 40 and S-GW 30 in response to "Paging" sent from the eNodeB 50 (step S109). Alternatively, when located in the radio zone of the UTRAN/GERAN 4, the UE 10 performs packet reception processing between the RNC/BSC 70, SGSN 60 and S-GW 30 in response to "Paging" sent from the SGSN 60.

When the paging processing is completed in step S109, the S-GW 30 sends "Stop Paging" for requesting both the MME 40 and the SGSN 60 to stop sending of "Paging" (steps S110a and S110b).

When the UE 10 is located in the radio zone of the E-UTRAN 2, the S-GW 30 sends the packet received in step S102 to the UE 10 via the eNodeB 50 (step S111a). Alternatively, when the UE 10 is located in the radio zone of the UTRAN/GERAN 4, the S-GW 30 sends the packet received in step S102 via the SGSN 60 and RNC/BSC 70 and a NodeB (not shown) or via the RNC/BSC 70 and NodeB (not shown) to the UE 10 (step S111b).

<Operation/Effect>

According to the mobile communication system according to the first embodiment, since the S-GW 30 sets reception type information of a packet for the UE 10 in the idle state received by the P-GW 20 in "Downlink Data notification" and the MME 40 and the SGSN 60 can thereby determine whether or not to page the UE 10 based on the reception type information included in "Downlink Data Notification." Therefore, even when a paging restriction is normally applied to the UE 10, for example, when the MME 40 or the SGSN 60 is in a congestion state, the MME 40 and the SGSN 60 can page the UE 10 depending on the contents of reception type information.

Furthermore, according to the mobile communication system according to the first embodiment, reception type information is set based on at least one of bearer identification information, bearer QoS information, default bearer information, P-GW information, PDN connection information, flow identification information and S-GW load information, and the MME 40 and the SGSN 60 which are core network apparatuses can thereby determine whether or not to page the UE 10 based on detailed conditions per bearer, per QoS of each bearer, per PDN connection, per flow or a combination thereof or the like together with the MME 40 and the SGSN 60 which are core network apparatuses, and thereby perform flexible paging control.

Second Embodiment

A second embodiment will describe a case where a radio access network apparatus (eNodeB 50, RNC/BSC 70) determines whether or not to page an UE 10 in the idle state, by focusing on differences from the first embodiment.

<Detailed Configuration of Mobile Communication System>

Figure 5:
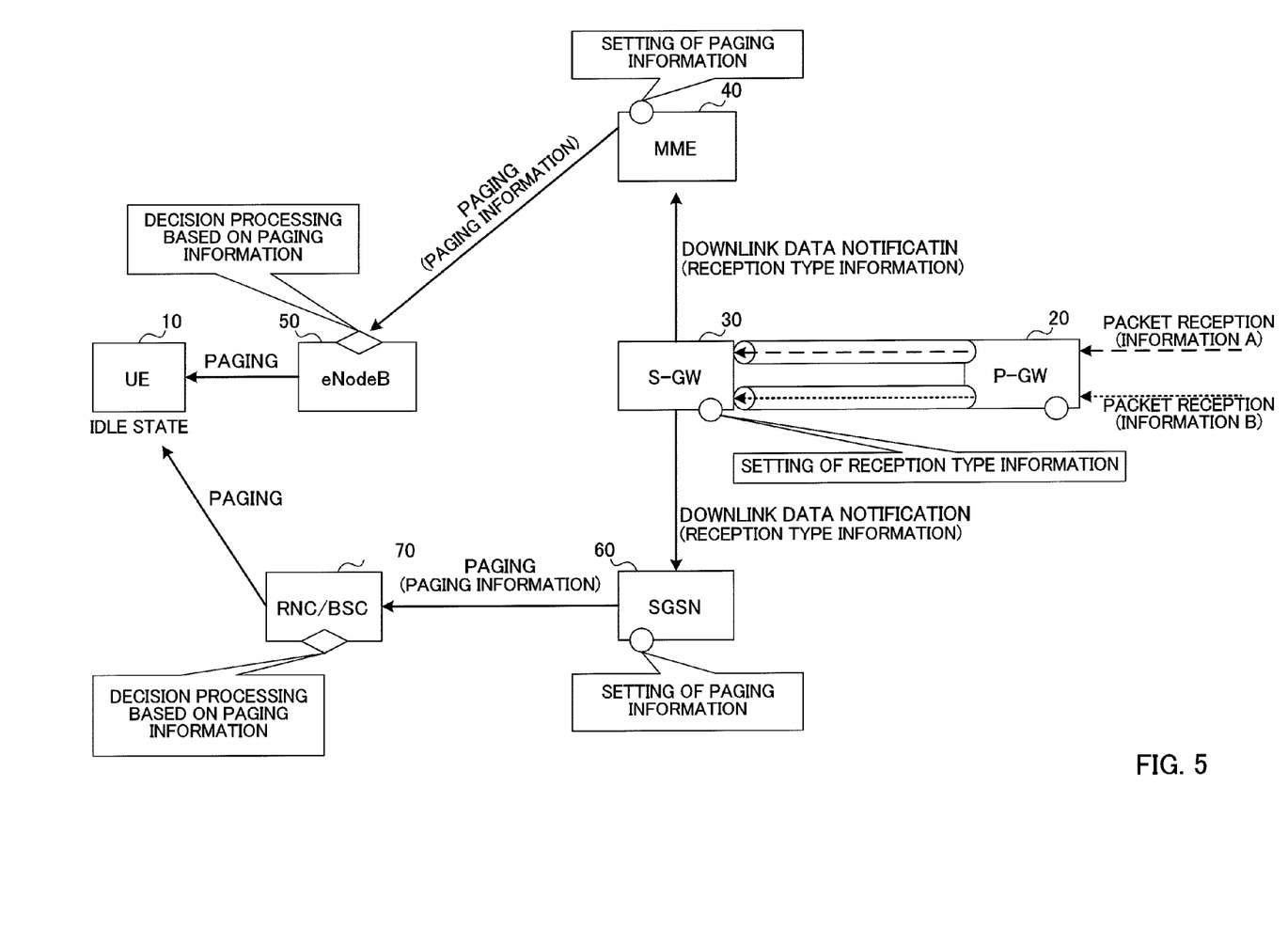
FIG. 5 is a function configuration diagram of paging processing in a mobile communication system according to a second embodiment.

FIG. 5 is a function configuration diagram of paging processing in a mobile communication system according to a second embodiment. In FIG. 5, as in the case of the first embodiment, suppose ISR is applied.

As shown in FIG. 5, an MME 40 which is a core network apparatus provided in an EPC 1 sets paging information for paging a UE 10 located in the service area of the radio zone of an E-UTRAN 2 in "Paging" based on reception type information included in "Downlink Data Notification" from an S-GW 30. To be more specific, the MME 40 sets paging information based on at least one item of information distinguished according to reception type information and capability information of the UE 10. The MME 40 sends "Paging" including paging information to an eNodeB 50.

Here, the information distinguished according to the reception type information is at least one of bearer identification information, bearer QoS information, default bearer information, P-GW information, PDN connection information, flow identification information and S-GW load information. Furthermore, the capability information of the UE 10 includes, for example, "UE Radio Access Capability" indicating a radio access capability of the UE 10.

The paging information may include at least one item of information distinguished according to the reception type information and the capability information of the UE 10 as described above. Furthermore, the paging information may be a parameter associated with at least one of the information distinguished according to the reception type information and the capability information of the UE 10. Examples of such a parameter include paging priority (e.g., 1: high priority, 2: medium priority, 3: low priority) indicating priority with which the UE 10 is paged.

The eNodeB 50 which is a radio access network apparatus provided in the E-UTRAN 2 determines whether or not to page the UE 10 located in the service area of the radio zone of the E-UTRAN 2 based on paging information included in "Paging" from the MME 40. In the case of predetermined reception type information, the eNodeB 50 sends "Paging" to the UE 10.

Similarly, an SGSN 60 which is a core network apparatus provided in a UMTS/GPRS core network 3 sets paging information for paging the UE 10 located in the service area of the radio zone of a UTRAN/GERAN 4 in "Paging" based on reception type information included in "Downlink Data Notification" from the S-GW 30. The SGSN 60 sends "Paging" including paging information to the RNC/BSC 70.

An RNC/BSC 70 which is a radio access network apparatus provided in the UTRAN/GERAN 4 determines whether or not to page the UE 10 located in the service area of the radio zone of the UTRAN/GERAN 4 based on paging information included in "Paging" from the SGSN 60. In the case of predetermined reception type information, the RNC/BSC 70 sends "Paging" to the UE 10.

<Operation of Mobile Communication System>

Next, a paging operation in the mobile communication system according to the second embodiment configured as described above will be described with reference to FIG. 6 and FIG. 7. Suppose ISR is applied to the following operation. Furthermore, since steps S301 to S303, S304*a* to S305*a*, S304*b* to S305*b* in FIG. 6 are similar to steps S101 to S103, S104*a* to S105*a*, and S104*b* to S105*b* in FIG. 3, descriptions thereof will be omitted.

Figure 6:
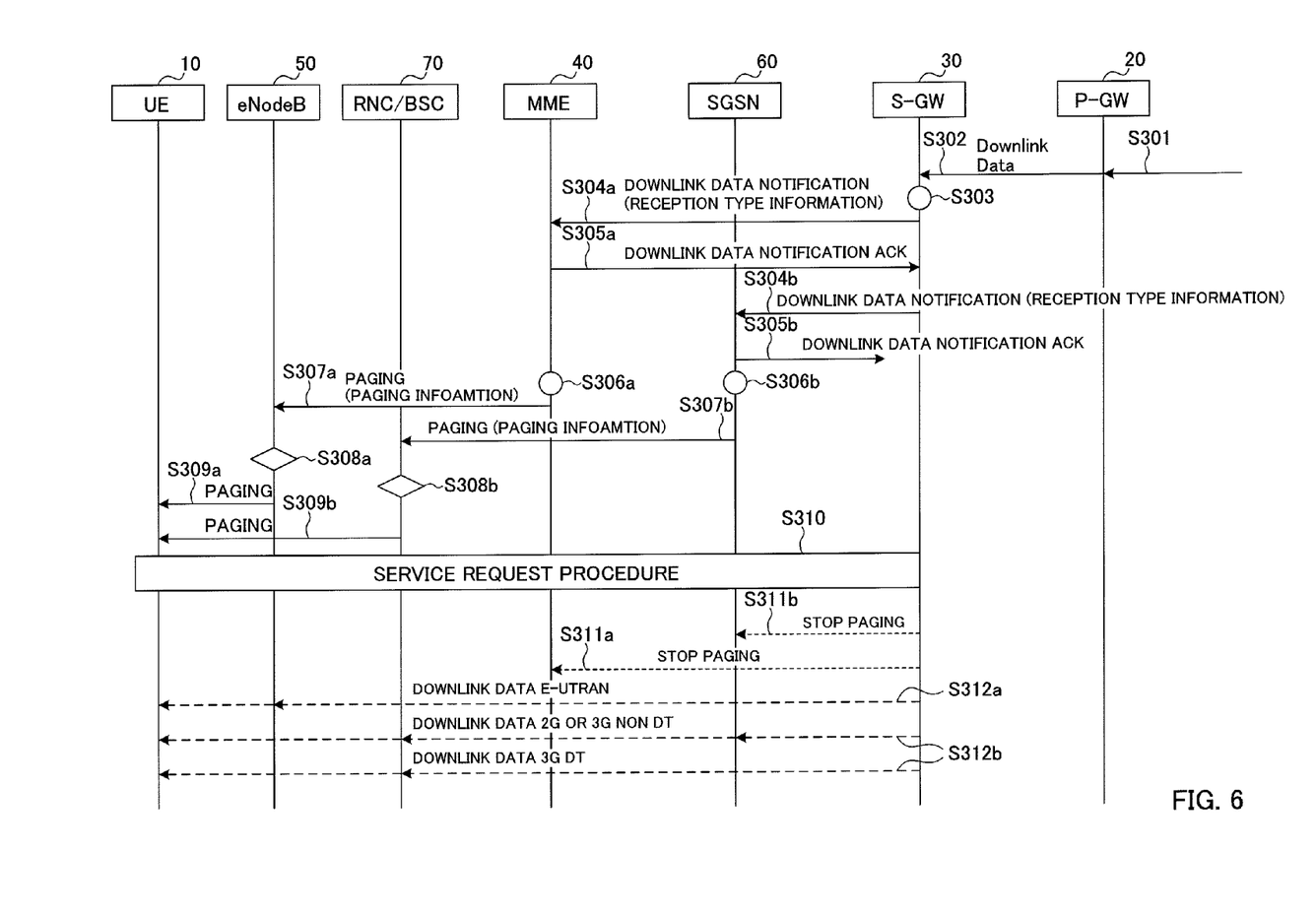
FIG. 6 is a sequence diagram illustrating a paging operation in the mobile communication system according to the second embodiment.

As shown in FIG. 6, the MME 40 sets paging information for paging the UE 10 in the idle state in "Paging" based on reception type information included in "Downlink Data Notification" from the S-GW 30 (step S306*a*). To be more specific, as described above, the MME 40 sets paging information based on at least one item of information distinguished according to the reception type information and capability information of the UE 10. The MME 40 sends "Paging" including the paging information to the eNodeB 50 (step S307*a*).

Figure 7:
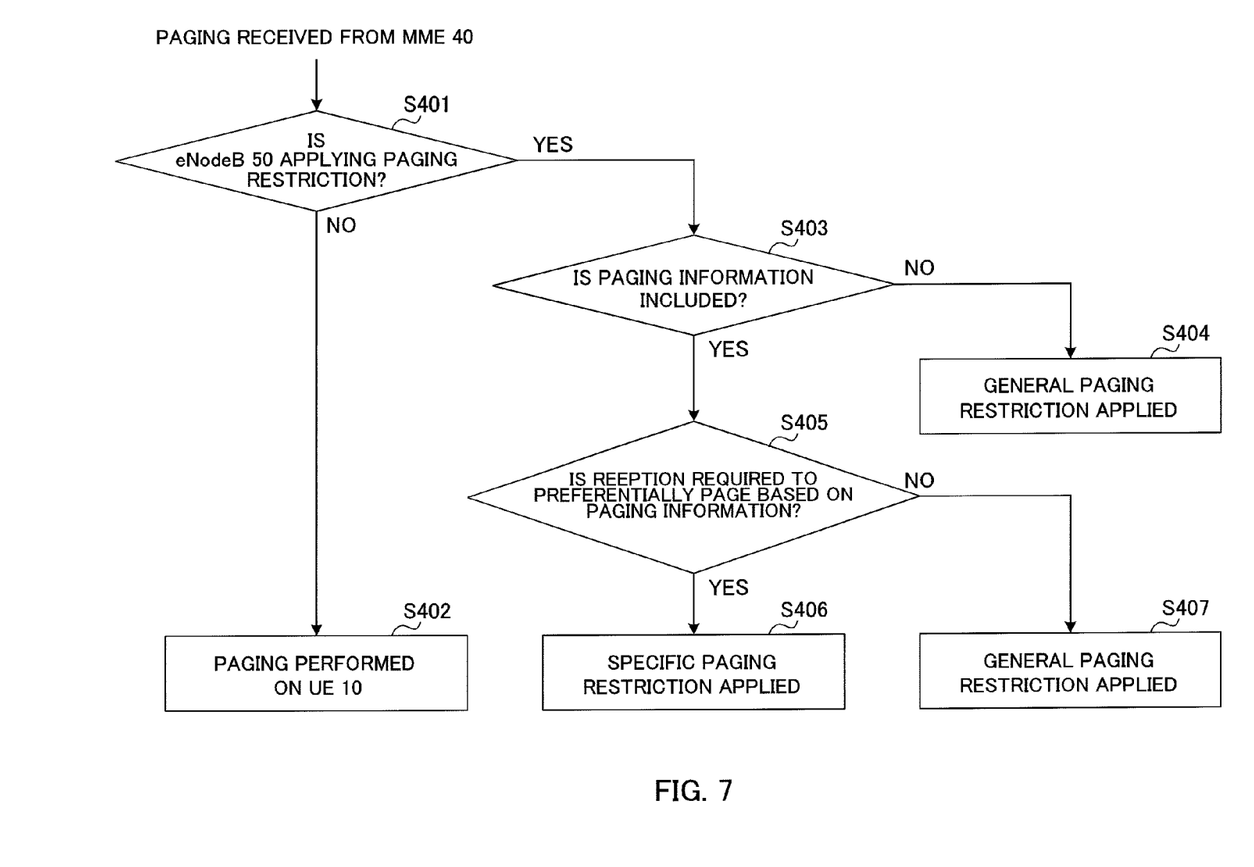
FIG. 7 is a flowchart illustrating paging processing in an eNodeB or RNC/BSC according to the second embodiment.

The eNodeB 50 determines whether or not to page the UE 10 located in the service area of the radio zone of the E-UTRAN 2 based on paging information included in "Paging" from the MME 40 (step S308*a*). The paging determination processing in step S308*a* will be described in detail with reference to FIG. 7. FIG. 7 is a flowchart illustrating paging determination processing in the eNodeB 50.

As shown in FIG. 7, upon receiving "Paging" from the MME 40, the eNodeB 50 determines whether or not the eNodeB 50 is applying a paging restriction (step S401). A paging restriction is applied, when, for example, the eNodeB 50 is in a congestion state or when the operator instructs the eNodeB 50 to apply a paging restriction to a specific subscriber unit or all subscribers. However, the present step is omissible and the present flowchart may be started from step S403.

When the eNodeB 50 is not applying a paging restriction (step S401; No), the eNodeB 50 sends "Paging" for paging the UE 10 in the idle state (step S402).

When the eNodeB 50 is applying a paging restriction (step S401; Yes), the eNodeB 50 determines whether paging information is included in "Paging" from the MME 40 or not (step S403).

When paging information is not included in "Paging" from the MME 40 (step S403; No), the eNodeB 50 determines whether or not to send "Paging" for paging the UE 10 in the idle state according to the general paging restriction (step S404). According to such a general paging restriction, when the eNodeB 50 is in a congestion state or when a predetermined condition set by the operator is satisfied (e.g., a specific subscriber unit or all subscribers is/are specified), the sending of "Paging" is canceled irrespective of the above-described paging information. When the sending of "Paging" is canceled according to the general paging restriction, the eNodeB 50 performs paging failure processing together with the MME 40, S-GW 30 or P-GW 20. On the other hand, when the sending of "Paging" is not canceled according to the general paging restriction, the eNodeB 50 sends "Paging" to the UE 10.

When "Paging" from the MME 40 includes paging information (step S403; Yes), the eNodeB 50 determines whether the reception is required to page the UE 10 preferentially or not based on the paging information (step S405).

When the eNodeB 50 determines that the reception is required to page the UE 10 preferentially (step S405; Yes), the eNodeB 50 determines, according to a specific paging restriction, whether or not to send "Paging" for paging the UE 10 in the idle state (step S406). According to the specific paging restriction, when the aforementioned paging information satisfies a predetermined condition, the sending of "Paging" is canceled. When the sending of "Paging" is canceled according to the specific paging restriction, the eNodeB 50 performs paging failure processing together with the MME 40, S-GW 30, P-GW 20 or the like. On the other hand, when the sending of "Paging" is not canceled according to the specific paging restriction, the eNodeB 50 sends "Paging" to the UE 10.

When the eNodeB 50 determines that the reception is not required to page the UE 10 preferentially (step S405; No), the MME 40 determines, according to a general paging restriction, whether or not to send "Paging" for paging the UE 10 in the idle state (step S407). Since the processing contents of this step are similar to those in step S404, descriptions thereof will be omitted.

As described above, in step S308*a* in FIG. 6, the paging determination processing in the eNodeB 50 is performed. In step S406 in FIG. 7, when the sending of "Paging" is not canceled, the eNodeB 50 sends "Paging" to the UE 10 (step S309*a*).

Processing similar to the processing in above steps S306*a* to S309*a* is also performed in steps S306*b* to S309*b*. Suppose the MME 40 and eNodeB 50 in steps S306*a* to S309*a* correspond to the SGSN 60 and RNC/BSC 70 in steps S306*b* to S309*b* respectively. In step S308*b*, the paging determination processing shown in steps S401 to S407 in FIG. 7 is performed in the RNC/BSC 70.

Since steps S310, S311*a* to S312*a*, S311*b* to S312*b* in FIG. 6 are similar to steps S109, S110*a* to S111*a*, S110*b* to S111*b* in FIG. 3, descriptions thereof will be omitted.

<Operation/Effect>

According to the mobile communication system according to the second embodiment, since the MME 40 and the SGSN 60 set paging information in "Paging" based on the reception type information included in "Downlink Data Notification" from the S-GW 30, the eNodeB 50 and the RNC/BSC 70 can determine whether or not to page the UE 10 respectively based on the paging information included in "Paging." Therefore, even in a situation in which a paging restriction is normally performed on the UE 10 such as when the eNodeB or the RNC/BSC 70 is in a congestion state, the eNodeB or the RNC/BSC 70 can page the UE 10 depending on contents of the paging information.

Furthermore, in the mobile communication system according to the second embodiment, paging information is set based on at least one of information determined by reception type information (bearer identification information, bearer QoS information, default bearer information, P-GW information, PDN connection information, flow identification information, S-GW load information or the like) and capability information of the UE 10, and therefore the eNodeB 50 and the RNC/BSC 70 can determine whether or not to page the UE 10 under detailed conditions per bearer, per bearer QoS, per PDN connection, per flow or a combination thereof or the like, and can perform flexible paging control.

Third Embodiment

In a third embodiment, a case will be described where the S-GW 30 determines whether or not to page the UE 10 in the idle state by focusing on differences from the first embodiment.

Figure 8:
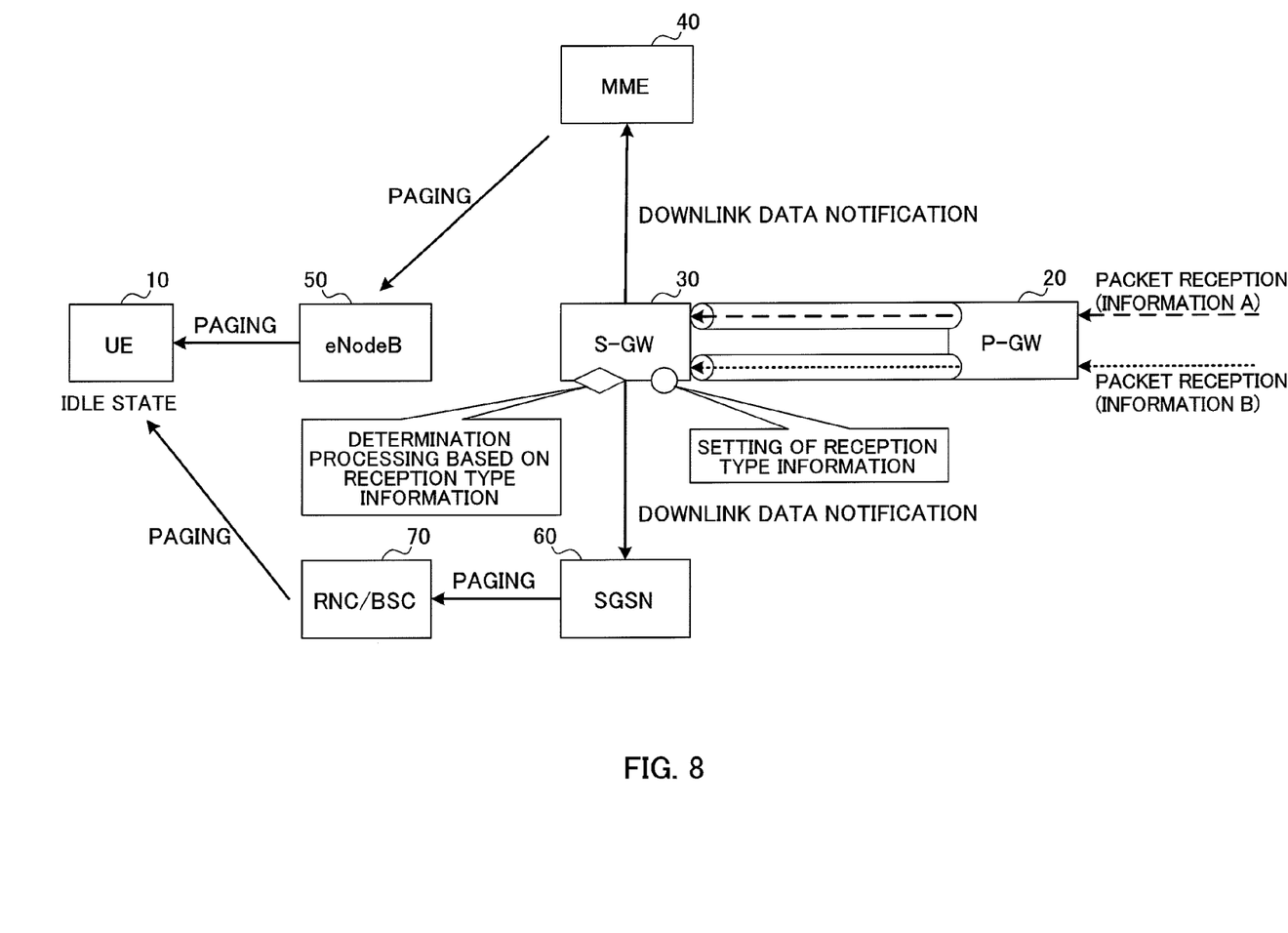
FIG. 8 is a function configuration diagram of paging processing in a mobile communication system according to a third embodiment.

FIG. 8 is a function block diagram of paging processing in a mobile communication system according to the third embodiment. As shown in FIG. 8, the S-GW 30 determines whether or not to page the UE 10 in the idle state based on at least one of bearer identification information, bearer QoS information, default bearer information, P-GW information, PDN connection information, flow identification information, and S-GW load information as described above. When the S-GW 30 determines that paging should be performed, the S-GW 30 sends "Downlink Data Notification" to the MME 40 which is a core network apparatus provided on the EPC 1. Similarly, the S-GW 30 sends "Downlink Data Notification" to the SGSN 60 which is a core network apparatus provided on the UMTS/GPRS core network 3.

Modification Example 1

Next, modification example 1 of the first to third embodiments will be described. In modification example 1, the P-GW 20 reports packet type information indicating the type of a received packet to the S-GW 30, and the S-GW 30 sets reception type information based on the packet type information in "Downlink Data Notification." Here, the P-GW 20 may also determine the packet type information based on information on the received packet (e.g., information set in the IP header of the received packet (e.g., DSCP code point, sending source server information (IP address, port number or the like)), packet data contents (application information or the like).

Figure 9:
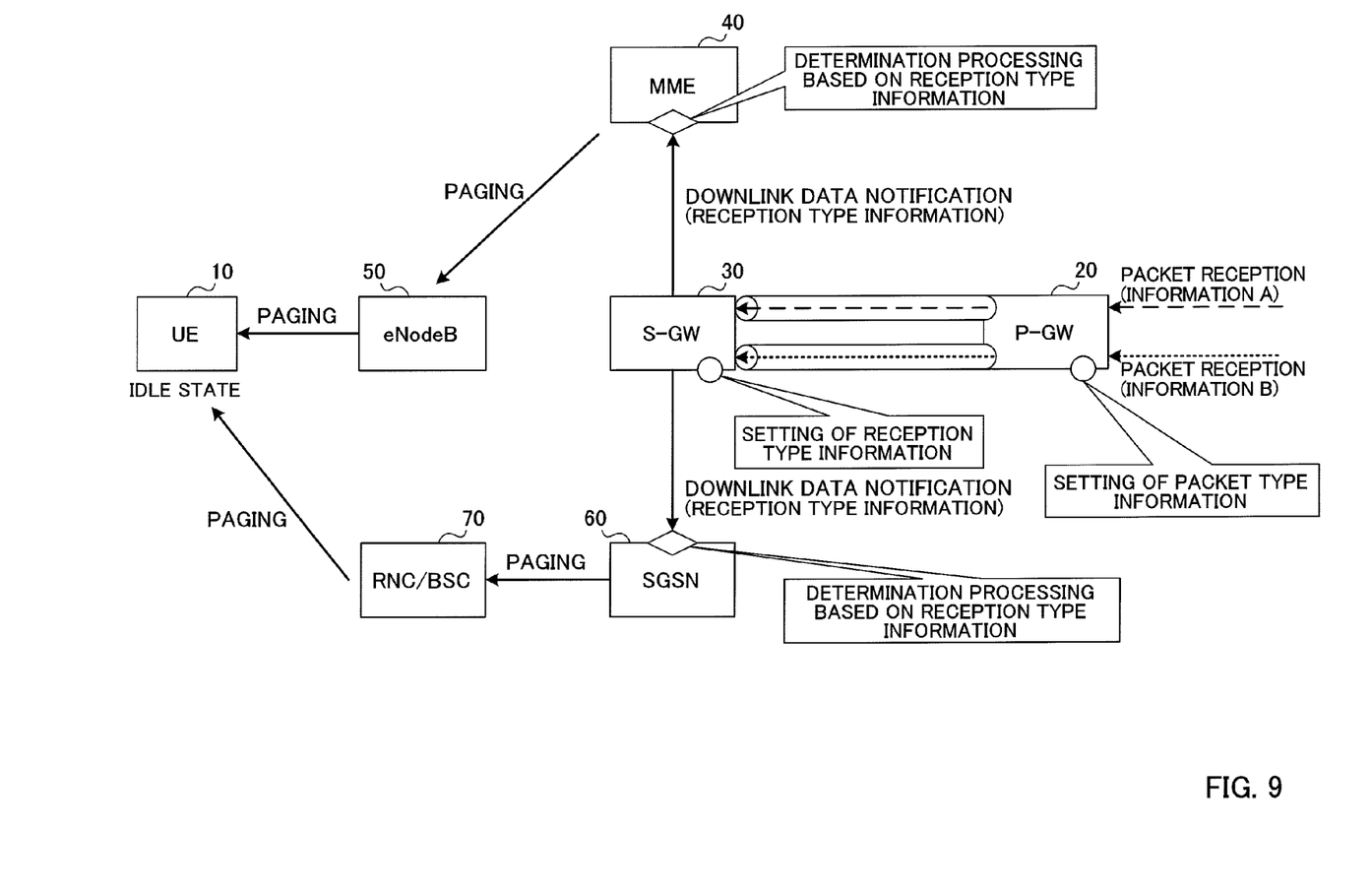
FIG. 9 is a function configuration diagram of paging processing in a mobile communication system according to modification example 1.

FIG. 9 is a function block diagram of paging processing in a mobile communication system according to modification example 1. As shown in FIG. 9, the P-GW 20 receives a packet for the UE 10 in the idle state from a PDN (not shown). The P-GW 20 sets packet type information indicating the type of the received packet as a GTP-U packet or GRE packet, and sends the GTP-U packet or GRE packet to the S-GW 30. The packet type information reported from the P-GW 20 to the S-GW 30 may be set, for example, in a DSCP code point which is an IP header portion of the encapsulated GTP-U or GRE packet. In such a case, the packet type information is set so as to be expressed by the value of the DSCP code point.

The S-GW 30 sets reception type information in "Downlink Data Notification" based on at least one of the packet type information from the P-GW 20, aforementioned bearer identification information, bearer QoS information, default bearer information, P-GW information, PDN connection information, flow identification information and S-GW load information.

According to the mobile communication system according to modification example 1, since reception type information is set based on the packet type information, the MME 40 and SGSN 60 which are core network apparatuses, or the eNodeB 50 and the RNC/BSC 70 which are radio access network apparatuses can determine whether or not to page the UE 10 for each type of a packet sent in one bearer, and thereby perform more flexible paging control.

Other Embodiments

The present invention has been described in detail using the aforementioned embodiments, but it is apparent to those skilled in the art that the present invention is not limited to the embodiments described in the present DESCRIPTION.

For example, the first and second embodiments may be combined so that the MME 40 and SGSN 60 which are core network apparatuses and the eNodeB 50 and RNC/BSC 70 which are radio access network apparatuses determine whether or not to page the UE 10 in the idle state. Similarly, the first and third embodiments, the second and third embodiments, and the first to third embodiments may be combined to determine whether or not to page the UE 10 in the idle state.

As described so far, the present invention can be implemented as modified or altered embodiments without departing from the spirit and scope of the present invention defined by the description of the scope of patent claims. Therefore, the description of the present DESCRIPTION is meant to be illustrative, and by no means meant to have any limitative meaning to the present invention.

The present application is based on Japanese Patent Application No. 2010-172794 filed on Jul. 30, 2010, entire content of which is expressly incorporated by reference herein.

The invention claimed is:

1. A paging method for paging a user terminal in an idle state when a first gateway apparatus receives a packet for the user terminal, the paging method comprising the steps of:
   in a second gateway apparatus, setting reception type information of the packet received by the first gateway apparatus in a paging request signal, the reception type information including bearer information of a bearer to which the packet received by the first gateway apparatus is mapped, and sending the paging request signal to a core network apparatus; and
   in the core network apparatus, determining whether or not to page the user terminal based on the bearer information included in the paging request signal from the second gateway apparatus, even when the core network apparatus is in a congestion state,
   wherein the paging request signal is a Downlink Data Notification signal, and when Service Request Procedure is completed in response to paging of the user terminal, the second gateway apparatus transmits the packet for the user terminal to a radio access network apparatus in a radio zone where the user terminal is located, and
   wherein the packet received by the first gateway apparatus is mapped to the bearer according to a Traffic Flow Template (TFT) for each flow of the packet in the first gateway apparatus, the bearer information is identification information of the bearer, and the core network apparatus determines whether or not to page the user terminal based on the identification information of the bearer included in the paging request signal.

2. The paging method according to claim 1, wherein the bearer is an Evolved Packet System (EPS) bearer.

3. The paging method according to claim 1, wherein the core network apparatus determines to page the user terminal if the bearer information indicates a specific bearer, even when the core network apparatus is in the congestion state.

4. A core network apparatus configured to page a user terminal in an idle state when a first gateway apparatus receives a packet for the user terminal, the core network apparatus comprising:
- a reception circuit that receives a paging request signal including reception type information which indicates a reception type of the packet, from a second gateway apparatus connected to the first gateway apparatus, the reception type information including bearer information of a bearer to which the packet received by the first gateway apparatus is mapped, and
- a processor that determines whether or not to page the user terminal based on the bearer information included in the received paging request signal, even when the core network apparatus is in a congestion state,
- wherein the paging request signal is a Downlink Data Notification signal, and when Service Request Procedure is completed in response to paging of the user terminal, the second gateway apparatus transmits the packet for the user terminal to a radio access network apparatus in a radio zone where the user terminal is located, and
- wherein the packet received by the first gateway apparatus is mapped to the bearer according to a Traffic Flow Template (TFT) for each flow of the packet in the first gateway apparatus, the bearer information is identification information of the bearer, and the processor determines whether or not to page the user terminal based on the identification information of the bearer included in the paging request signal.

5. A gateway apparatus configured to send a paging request signal to a core network apparatus so as to page a user terminal in an idle state from the core network apparatus via a radio access network apparatus, when a packet for the user terminal is received, the gateway apparatus comprising:
- a processor that sets reception type information of the packet in the paging request signal, the reception type information including bearer information of a bearer to which the packet received by a first gateway apparatus is mapped, and
- a transmission circuit that sends the paging request signal to the core network apparatus, so that the core network apparatus can determine whether or not to page the user terminal based on the bearer information, even when the core network apparatus is in a congestion state, and
- wherein the paging request signal is a Downlink Data Notification signal, and when Service Request Procedure is completed in response to paging of the user terminal, the transmission circuit transmits the packet for the user terminal to the radio access network apparatus in a radio zone where the user terminal is located, and
- wherein the packet received by the first gateway apparatus is mapped to the bearer according to a Traffic Flow Template (TFT) for each flow of the packet in the first gateway apparatus, the bearer information is identification information of the bearer, and the core network apparatus determines whether or not to page the user terminal based on the identification information of the bearer included in the paging request signal.

* * * * *